United States Patent

Ou et al.

[11] Patent Number: 5,859,634
[45] Date of Patent: Jan. 12, 1999

[54] VERTICAL POSITION-JITTER ELIMINATION

[75] Inventors: Hsien C. Ou, Taipei; Chi-Tien Chen, Taoyuan, both of Taiwan; Evert D. Van Veldhuizen, Eindhoven, Netherlands

[73] Assignee: U.S. Philips Corporation, New York, N.Y.

[21] Appl. No.: 567,259

[22] Filed: Dec. 5, 1995

[30] Foreign Application Priority Data

Dec. 6, 1994 [EP] European Pat. Off. .............. 94203542

[51] Int. Cl.$^6$ ........................................................ G09G 5/00
[52] U.S. Cl. ........................... 345/213; 345/115; 348/497
[58] Field of Search ........................... 345/113–116, 213; 348/497, 499, 536, 540, 541, 547, 569, 570

[56] References Cited

U.S. PATENT DOCUMENTS

| | | | |
|---|---|---|---|
| 4,677,484 | 6/1987 | Pitsch et al. | 348/540 |
| 5,608,425 | 3/1997 | Movshovich | 345/141 |

FOREIGN PATENT DOCUMENTS

| | | | |
|---|---|---|---|
| 0242917 | 10/1987 | European Pat. Off. | ......... H04N 5/93 |
| 0562413 | 9/1993 | European Pat. Off. | ....... H04N 5/445 |
| 62-81174 | 4/1987 | Japan | ................. H04N 5/06 |
| 2143777 | 6/1990 | Japan | ................. H04N 5/06 |
| 3236092 | 10/1991 | Japan | ................. G09G 5/12 |

*Primary Examiner*—Jeffery Brier
*Attorney, Agent, or Firm*—Edward W. Goodman

[57] ABSTRACT

A first information (I) is displayed on a display screen of a display device (5). A vertical and horizontal position of a field of the first information (I) on the display screen is determined by a vertical start pulse (V) and by horizontal start pulses (H), both corresponding to or being extracted from the first information (I). The vertical position of a second information (Oi) on the display screen is determined by counting a certain number of the horizontal start pulses (H). To eliminate any remaining jitter, a time difference (Td) is determined between the active edge of the vertical start pulse (V) and that horizontal start pulse (H) which is nearest to the active edge of the vertical start pulse (V). If this time difference (Td) is smaller than a certain safe margin (Ni), the nearest horizontal start pulse (H) is so close to the active edge of the vertical start pulse (V), that an occurrence of vertical jitter is becoming likely. To avoid a dangerous vertical jitter situation, in a next field, the active edge of the vertical start pulse (V) is shifted in time over a shift period (Di), to obtain sufficient distance between the active edge of the vertical start pulse (V) and the nearest horizontal pulse (H).

15 Claims, 7 Drawing Sheets

VERTICAL POSITION-JITTER ELIMINATION

BACKGROUND OF THE INVENTION

1. Field of the Invention

The invention relates to a method for eliminating vertical position-jitter of a second information (Oi) displayed on a display device on which a first information (I) is displayed, the first information (I) determining an addressing of the display device, the method comprising the steps of generating vertical start pulses (V) and horizontal start pulses (H) to control vertical start positions of fields of the first information (I) and horizontal start positions of lines of the first information (I), respectively, on the display device; and counting a predetermined number of the horizontal start pulses (H), to define a vertical start position for a display of the second information (Oi) on the display device.

The invention also relates to a vertical position-jitter elimination circuit for eliminating jitter in a vertical position of a second information (Oi) displayed on a display device on which a first information (I) is displayed, the first information (I) determining an addressing of the display device, the circuit comprising a processing circuit coupled to receive the first information (I), for generating vertical (V) and horizontal (H) start pulses to control vertical start positions of fields of lines, and horizontal start positions of the lines, respectively, of the first information (I) on the display device; timing means for supplying a vertical position signal (Vp), defining a vertical starting position on the display of the second information (Oi), by counting a predetermined number of the horizontal start pulses (H); and an on-screen-display circuit coupled to receive said vertical position signal (Vp) for inserting a display of said second information (Oi) on said display device.

The invention also relates to a picture display apparatus containing such a vertical position-jitter elimination circuit.

The invention also relates to a method for eliminating vertical position-jitter of a second information (Oi) displayed on a display device on which a first information (I) is displayed, the first information (I) determining an addressing of the display device, the method comprising the steps of generating vertical start pulses (V) and horizontal start pulses (H) to control vertical start positions of fields of the first information (I) and horizontal start positions of lines of the first information (I), respectively, on the display device.

The invention is relevant for eliminating jitter in a vertical position of a second information displayed on a display screen, wherein a first information determines the addressing of the display screen. The first information may be a television image, and the second information may be a PIP image, Teletext, or an On-Screen Display (OSD) information.

2. Description of the Related Art

Such a vertical position-jitter elimination circuit is known from Japanese Patent Application JP-A-3-236092. In the known vertical position-jitter elimination circuit, a first information is displayed on a display screen. Vertical and horizontal positions of the first information on the display screen are determined by a moment of occurrence of, respectively, vertical and horizontal start pulses, and both start pulses are extracted from the first information (and in this case being vertical and horizontal flyback pulses). In every field of the first information (I), a vertical starting position of a second information is determined by counting a certain number of the horizontal start pulses after a leading edge of the vertical start pulse. In this case, the second information is an On-Screen Display (OSD) information.

A drawback of the known vertical position-jitter elimination circuit is that in certain situations, a vertical jitter of the second information occurs.

SUMMARY OF THE INVENTION

It is, inter alia, an object of the invention to provide an improved method for elimination of vertical position-jitter, and to provide an improved vertical position-jitter elimination circuit.

To this end, a first aspect of the invention provides a method for eliminating vertical position-jitter, characterized in that the method comprises the further steps of generating, in a first field of the first information (I), and in response to an active edge of a first vertical start pulse (V), a first vertical trigger pulse (Vt) having an active edge which is the active edge of the first vertical start pulse (V) shifted in time over a predetermined first shift period (Di); starting, in each field of the first information (I), the counting of the predetermined number of the horizontal start pulses (H) in response to an active edge of a corresponding vertical trigger pulse (Vt), whereby the active edge of the vertical trigger pulse (Vt) is an active edge of a corresponding vertical start pulse (V) shifted over a current shift period (Di); generating, in each field of the first information (I), and in response to an active edge of a corresponding vertical start pulse (V), a next vertical trigger pulse (Vt') having an active edge which is shifted with respect to an active edge of a next vertical start pulse (V') over said current shift period (Di); and generating, in predetermined fields of the first information (I), and in response to active edges of corresponding vertical start pulses (V), adjusted shift periods (Dj) by the steps of determining a current time difference (Td) between, on the one hand, an active edge of a current vertical trigger pulse (Vt), and, on the other hand, an active edge of a current horizontal start pulse (H) nearest to the active edge of the current vertical trigger pulse (Vt); checking whether the current time difference (Td) is smaller than a current predetermined value (Ni); and generating a next shift period (Dj) unequal to the current shift period (Di), if the current time difference (Td) is smaller than the current predetermined value (Ni), whereby said next shift period (Dj) is selected such that an absolute value of a time difference between an active edge of a hypothetical vertical trigger pulse derived from the current vertical start pulse (V) by shifting over said next shift period (Dj), on the one hand, and the active edge of the current horizontal start pulse (H) nearest to said hypothetical vertical trigger pulse, on the other hand, is not smaller than the current predetermined value (Ni), said next shift period (Dj) forming the current shift period (Di) for a next field of the first information (I).

A second aspect of the invention provides a vertical position-jitter elimination circuit, characterized in that the vertical position-jitter eliminating circuit further comprises shifting means coupled to receive a vertical start pulse (V) and a shift period (Di), for supplying, in a first field of the first information (I), a first vertical trigger pulse (Vt) having an active edge corresponding to an active edge of a first vertical start pulse (V) shifted in time over a first shift period (Di) wherein the timing means are coupled to receive a vertical trigger pulse (Vt) for initiating, in each field of the first information (I), the counting (3) of the predetermined number of the horizontal start pulses (H), whereby an active edge of the vertical trigger pulse (Vt) is an active edge of a corresponding vertical start pulse (V) shifted over a current shift period (Di), wherein the shifting means are arranged for supplying, in each field of the first information (I), a next vertical trigger pulse (Vt') having an active edge corresponding to an active edge of a next vertical start pulse (V') shifted in time over the current shift period (Di), and in that the circuit further comprises time detection means coupled to receive a vertical start pulse (V), a vertical trigger pulse (Vt), and the horizontal start pulses (H), for supplying, in predetermined fields of the first information (I), a current time difference signal (Td) being a measure of a time difference in occurrence between on the one hand an active edge of a current vertical trigger pulse (Vt), and on the other hand an active edge of a current horizontal start pulse (H) nearest to the active edge of the current vertical trigger pulse (Vt), wherein the shifting means are further coupled to receive the current time difference signal (Td), and a predetermined value (Ni), for checking, in said predetermined fields of the first information (I), whether the current time difference signal (Td) is smaller than a current predetermined value (Ni), and wherein the shifting means generates, in a next field, a next shift period (Dj) unequal to the current shift period (Di), if the current time difference (Td) is smaller than the current predetermined value (Ni), whereby said next shift period (Dj) is selected such that an absolute value of a time difference between an active edge of a hypothetical vertical trigger pulse derived from the current vertical start pulse (V) by shifting over said next shift period (Dj) on the one hand, and the active edge of the current horizontal start pulse (H) nearest to said hypothetical vertical trigger pulse on the other hand, is not smaller than the current predetermined value (Ni), said next shift period (Dj) forming the shift period (Di) for a next field of the first information (I).

A third aspect of the invention provides a picture display apparatus incorporating said vertical position-jitter elimination circuit.

A fourth aspect of the invention provides a method for eliminating vertical position-jitter, characterized in that the method comprises the further steps of generating, in a first field of the first information (I), in response to active edges of first horizontal start pulses (H), first horizontal count pulses (Hc), at least one of the first horizontal count pulses (Hc) having an active edge which is the active edge of a corresponding horizontal start pulse (H) shifted in time over a predetermined first shift period (Di), the at least one of the first horizontal count pulses (Hc) being nearest to an active edge of a corresponding vertical start pulse (V); and counting, in each field of the first information (I), a predetermined number of horizontal count pulses (Hc) in response to an active edge of a corresponding vertical start pulse (V), to define a vertical start position (Vp) for a display of the second information (Oi) on the display device, whereby an active edge of at least one of said horizontal count pulses (Hc) is an active edge of a corresponding horizontal start pulse (H) shifted over a current shift period (Di), the at least one of said horizontal count pulses (Hc) being nearest to an active edge of the corresponding vertical start pulse (V); generating, in each field of the first information (I), in response to active edges of next horizontal start pulses (H'), next horizontal count pulses (Hc'), at least one of said next horizontal count pulses (Hc') having an active edge which is shifted with respect to the active edge of a corresponding one of the next horizontal start pulses (H') over said current shift period (Di), the at least one of said next horizontal count pulses (Hc') being nearest to an active edge of a corresponding next vertical start pulse (V'); and generating, in predetermined fields of the first information (I), in response to active edges of corresponding vertical start pulses (V), adjusted shift periods (Dj) by the steps of determining a current time difference (Td) between, on the one hand, an active edge of a current vertical start pulse (V), and, on the other hand, an active edge of a current horizontal count pulse (Hc) nearest to the active edge of the current vertical start pulse (V); checking whether the current time difference (Td) is smaller than a current predetermined value (Ni); and generating a next shift period (Dj) unequal to the current shift period (Di), if the current time difference (Td) is smaller than the current predetermined value (Ni), whereby said next shift period (Dj) is selected such that an absolute value of a time difference between an active edge of a hypothetical horizontal count pulse nearest to the active edge of the current vertical start pulse (V), which hypothetical horizontal count pulse is derived from a corresponding current horizontal start pulse (H) by shifting over said next shift period (Dj) on the one hand, and the active edge of the current vertical start pulse (V) on the other hand, is not smaller than the current predetermined value (Ni), said next shift period (Dj) forming the current shift period (Di) for a next field of the first information (I).

These aspects result in that a jitter in a vertical position of a second information with respect to a vertical position of a first information is eliminated in all situations.

The invention is based on the recognition that in the prior art, a shift between a moment of occurrence of, on the one hand, an active edge of a horizontal start pulse being nearest to an active edge of a vertical start pulse (further referred to as active edge of the nearest horizontal start pulse), and, on the other hand, the active edge of the vertical start pulse, can cause vertical position-jitter of a second information. The prior art determines a vertical starting position of the second information by counting a certain number of the horizontal start pulses after an active edge of the vertical start pulse. The counter receives a reset pulse before or at the active edge of the vertical start pulse. So, at the active edge of a first horizontal start pulse after the active edge of the nearest horizontal start pulse, a count value of the counter will be one if an active edge of a nearest horizontal start pulse occurs after the active edge of the vertical start pulse, or the count value will be zero if the active edge of the nearest horizontal start pulse occurs before the active edge of the vertical start pulse. So, a small time shift of the active edge of the nearest horizontal start pulse around the active edge of the vertical start pulse causes a jitter of about a line period in the vertical position of the second information. Such a shift in time of the active edge of the nearest horizontal start pulse can easily occur in picture display apparatuses, such as television receivers and computer monitors, during adjustment of a horizontal position (horizontal shift) of the first information on the display screen, or due to ageing or temperature drift of circuits.

To eliminate the vertical position-jitter of the second information in all situations, according to the invention, the following measure is proposed. If, in an existing frame, a time difference between the active edge of the nearest horizontal start pulse and the active edge of the vertical start pulse is smaller than a predetermined value, in a next frame, the active edge of the vertical start pulse is shifted over a certain time period (further referred to as certain shift period). Or, if, in the existing frame, the active edge of the vertical start pulse is already shifted over the certain shift period (the "current shift period"), and a time difference between the active edge of the nearest horizontal start pulse and the active edge of the vertical start pulse delayed over the certain shift period is smaller than a predetermined value, in the next frame, the vertical position-jitter can be eliminated by shifting the active edge of the vertical start pulse delayed over the certain shift period, over a "next shift period". This next shift period has a duration different than the current shift period. The duration of one of the shift periods can be zero. It is convenient to start up the vertical position-jitter elimination circuit with a first shift period having a value of zero. The active edge of the vertical start pulse shifted over a shift period, is referred to as an active edge of a vertical trigger pulse. This active edge of the vertical trigger pulse is used to start the counting of the certain number of the horizontal start pulses for determining the vertical starting position of the second information. The next shift period is chosen to have a duration such that in a next field, an absolute value of a time difference between an active edge of a next vertical trigger pulse derived from a corresponding vertical start pulse by shifting over said next shift period, on the one hand, and a corresponding horizontal start pulse nearest to said next vertical trigger pulse, on the other hand, is not smaller than a next predetermined value. Or, the next shift period is chosen to have a duration such that, in the existing field, the time difference, between the nearest horizontal start pulse and the vertical start pulse shifted with the next shift period, is larger than a next predetermined value. Or, defined in more concise wording: in a certain field of the first information, the next time period is selected or calculated such that an absolute value of a difference between a duration of the next shift period and a time difference between the vertical start pulse and the nearest horizontal start pulse, is larger than the next predetermined value. In the way described above, it is ensured that the active edge of the vertical trigger pulse will be shifted away from a dangerous region around the active edge of the nearest horizontal start pulse, so that if a stable time relation between the vertical trigger pulse and the nearest horizontal start pulse exists, no vertical position-jitter will occur any more.

It will be appreciated that it is also possible to shift at least the active edge of the nearest horizontal start pulse in time, instead of shifting the vertical start pulse in time.

The method, characterized in that in a next field the active edge of the next vertical trigger pulse (Vt') is shifted over the current shift period (Di) if the current time difference (Td) is not smaller than the current predetermined value (Ni) corresponding to the current shift period (Di), or the next shift period (Dj) is a shift period (Di+1) succeeding to the current shift period (Di), if the current time difference (Td) is smaller than the current predetermined value (Ni), wherein the succeeding shift period (Di+1) is a first shift period (D1) if i+1 is larger than n, uses a set of consecutive shift periods and corresponding predetermined values. The consecutive shift periods and the corresponding predetermined values are arranged in ascending or descending order. In an existing frame, the active edge of the vertical trigger pulse is again the active edge of the vertical start pulse delayed over an existing shift period.

If the time difference is determined by measuring a time duration elapsing between the active edge of the vertical start pulse and an active edge of the first occurring horizontal start pulse after the active edge of the vertical trigger pulse, the corresponding predetermined values represent a time duration starting at the active edge of the vertical start pulse and lasting until a certain margin after the active edge of the vertical trigger pulse. If this time duration is too close to the corresponding predetermined value, thus when the active edge of the horizontal start pulse is too close to the active edge of the vertical trigger pulse, a next shift period and a corresponding next predetermined value will be selected in a next frame. In this way, the active edge of the vertical trigger pulse is shifted away from the active edge of the nearest horizontal start pulse to avoid a possible vertical position-jitter of the second information.

If the time difference is determined by measuring a time duration elapsing between the active edge of the vertical trigger pulse and the active edge of the first occurring horizontal start pulse after the active edge of the vertical trigger pulse, the corresponding predetermined values represent a time duration starting at the active edge of the vertical trigger pulse and lasting until a certain margin after the active edge of the vertical trigger pulse. In this case, all predetermined values could be equal. If said time duration is too close to the corresponding predetermined value, thus when the active edge of the horizontal start pulse is too close to the active edge of the vertical trigger pulse, a next shift period and a corresponding next predetermined value will be selected in a next frame. In this way, again the active edge of the vertical trigger pulse is shifted away from the active edge of the nearest horizontal start pulse to avoid a possible vertical position-jitter.

If, in the existing field, the shift period and the corresponding predetermined value are the last out of the set of consecutive shift periods and corresponding predetermined values, and the active edge of the horizontal start pulse is too close to the active edge of the vertical trigger pulse, in the next field, a first shift period and a corresponding first predetermined value will be selected out of the set of consecutive shift periods and corresponding predetermined values.

The advantage of having a plurality of shift periods is set out below. Presume, only a first and a second shift period are used, both having a constant duration. If, in an existing frame, the active edge of the nearest horizontal start pulse is too close to the active edge of the vertical trigger pulse which is shifted by the first shift period, in a next frame, the second shift period will be selected to shift away the active edge of the vertical trigger pulse from the active edge of the nearest horizontal start pulse. A possible vertical position-jitter is prevented most effectively if the duration of the first and the second shift periods are chosen as different as possible. Practical values of the duration of the two shift periods could be: zero and a quarter of a line period. In the case of NTSC transmissions, this would result in a second shift period of sixteen microseconds. But, in case of a computer VGA-mode, the line period could become smaller than sixteen microseconds, and the second shift period has become useless. So, in providing more shift periods (for instance in steps of two microseconds), vertical position-jitter elimination will be possible in multi-scanning systems without the need to link the duration of the shift periods to the line period.

Another advantage of having a lot of shift periods is that the vertical trigger pulse can stay as close as possible to the vertical start pulse. As long as the nearest horizontal start pulse is not too close to the vertical start pulse, a first shift period can be chosen to be zero. If the nearest horizontal start pulse is too close to the vertical start pulse, a second shift period can be chosen to be a small period, so that the vertical trigger pulse still is close to the vertical start pulse, but far enough away to prevent vertical position-jitter. If, in this situation, still vertical position-jitter occurs, a next shift period can be chosen, having a value somewhat larger than the second shift period, and so on.

By introducing a cycling through of the set of consecutive shift periods and corresponding predetermined values, the method of cancelling vertical position-jitter according to the invention has the advantage that if, in a non-standard situation (for instance a missing or a false horizontal synchronization pulse introduced into the first information by disturbances in the transmission), a dangerous situation is detected (the active edge of a false nearest horizontal start pulse is too close to the active edge of the vertical trigger pulse), the chance is very low that after termination of the non-standard situation, again a dangerous situation will be detected. The method of cancelling vertical position-jitter according to the invention will always find a stable situation within a short time. The cycling through of consecutive shift periods, for instance, in a finite state machine or in a software algorithm, is implemented in a simpler way than a non-consecutive cycling, although such a non-consecutive cycling also eliminates the vertical position-jitter.

The method, characterized in that the next shift period (Dj) is generated by generating a vertical delayed-pulse (Vp) corresponding to the vertical start pulse (V) delayed over a first shift period (D1), or a delayed-pulse (Vd) corresponding to the vertical delayed-pulse (Vp) delayed over a second shift period (Du2), wherein the vertical delayed-pulse (Vp) determines the first shift period (D1), and the delayed-pulse (Vd) determines a second shift period (D2), respectively, and the generation, in the next field, of the next vertical trigger pulse (Vt') comprises the step of changing said next shift period (Dj) over which the active edge of the next vertical trigger pulse (Vt') is shifted with respect to the active edge of the next vertical start pulse (V'), to an other of the two shift periods (D1,D2) if said first occurring active edge of the horizontal start pulse (H) occurs during the window pulse (W), whereby said next shift period (Dj) is not changed (20) to an other of the two shift periods (D1,D2) if the active edge of the horizontal start pulse (H) does not occur during the window pulse (W), has the advantage that it consists of simple steps. The active edge of the vertical trigger pulse can occur on only two positions, so only two shift periods have to be generated. Two predetermined values, corresponding to the two shift periods, are generated by way of a window pulse, starting at the active edge of the vertical trigger pulse, and having a certain duration. If the active edge of the horizontal start pulse occurs during the window pulse, another of the two shift periods will be selected in the next frame for creating a safe time difference between the active edge of the vertical trigger pulse and the nearest horizontal trigger pulse, so that no vertical position-jitter occurs.

If, for instance, the first position of the vertical trigger pulse is equal to the position of the active edge of the vertical start pulse, and the second position of the vertical trigger pulse is a vertical start pulse delayed over a certain shift period (so: the first shift period has a duration zero and the second shift period has a duration which is not critical and can range for instance from several micro-seconds up to half a line period), only one shift period needs to be generated.

The predetermined values can be chosen to be equal for both positions of the active edge of the vertical trigger pulse (or equal for both shift periods), so that only one window pulse has to be generated.

The method, characterized in that the method further comprises the step of generating clock pulses (CLK), and in that the determining of the current time difference (Td) comprises the step of determining a count value (C) by counting the clock pulses (CLK), has the advantage that the time duration elapsing between the active edge of the vertical start pulse and the active edge of the first occurring horizontal start pulse after the active edge of the vertical trigger pulse, or the time duration elapsing between the active edge of the vertical trigger pulse and the active edge of the first occurring horizontal start pulse after the active edge of the vertical trigger pulse, is determined in an accurate way by counting clock pulses.

The method, characterized in that the method further comprises the step of generating clock pulses (CLK), and in that the step of generating (140) the window duration (Du1) comprises the step of counting (140) a predetermined number of the clock pulses (CLK), has the advantage that the certain duration of the window pulse is determined in an accurate way by counting clock pulses.

The method, characterized in that the method further comprises the steps of generating (5) clock pulses (CLK), and counting a predetermined number of the clock pulses (CLK) to generate the shift periods (Di,Dj), has the advantage that the duration of the shift periods is determined in an accurate way by counting clock pulses.

The method, characterized in that the step of generating (6) the clock pulses (CLK) comprises the steps of separating horizontal synchronization pulses (Hs) from the first information (I); generating the clock pulses (CLK), which have a clock pulse repetition frequency being equal to a repetition frequency of the horizontal synchronization pulses (Hs) multiplied by a certain number; dividing the clock pulses (CLK) by the certain number to generate regenerated horizontal synchronization pulses (Hr); and comparing a phase and/or frequency difference of the horizontal synchronization pulses (Hs) and the regenerated horizontal synchronization pulses (Hr), to generate a control signal (Vc) to control the clock pulse repetition frequency for locking the repetition frequency of the regenerated horizontal synchronization pulses (Hr) to the horizontal synchronization pulses (Hs), and in that the generation of the horizontal start pulses (H) is locked to the regenerated horizontal synchronization pulses (Hr), generates clock pulses with a repetition frequency locked to a repetition frequency of horizontal synchronization pulses of the first information by using a phase-locked loop. This has the advantage that all shift periods and time durations determined by the counting of the clock pulses will change with a repetition frequency of the horizontal synchronization pulses, so that all shift periods and all time durations will be a fixed percentage of a horizontal time period. Therefore, the method according to the invention is independent of the horizontal time period of the first information, which is advantageous in applications in which a horizontal frequency of the first information can have several values, for instance, depending on the resolution to be displayed. Such a first information can be generated by computer graphic-cards.

BRIEF DESCRIPTION OF THE DRAWINGS

The foregoing and other aspects of the invention are described in more detail by way of example with reference to the accompanying drawings, in which.

DESCRIPTION OF THE PREFERRED EMBODIMENTS

Figure 1A:
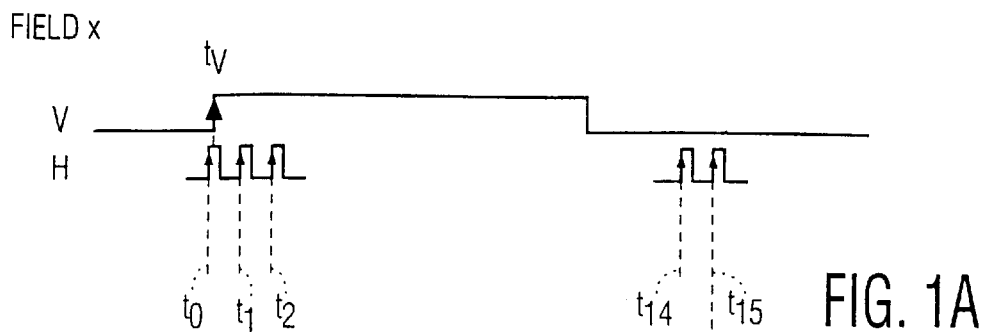
FIGS. 1A and 1B show timing diagrams for explaining the problem occurring in the prior art.
Figure 1B:
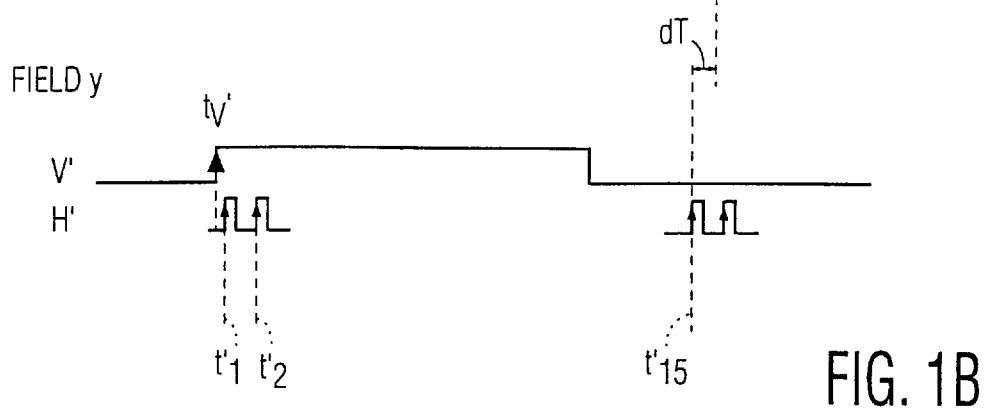

FIG. 1A shows, in a field x of a first information I, a vertical start pulse V and horizontal start pulses H. An active edge of one of the horizontal start pulses H occurs at moment t0 just before an active edge of the vertical start pulse V at moment tv. A timing circuit 3 (FIG. 2A) will start counting a certain number (in this example chosen to be 15) of horizontal start pulses H after the active edge of the vertical start pulse V. At moment t15, the certain number of horizontal start pulses H is counted, and a display of a second information Oi starts. If, in another field y of the first information I, the active edge of one of the horizontal start pulses H occurs at moment t1' short in time after the active edge of another vertical start pulse V' occurring at moment Tv', this horizontal start pulse H occurring at moment t1' will be counted as the first horizontal start pulse H. At the moment t15' the certain number of horizontal start pulses H is counted, and the display of the second information Oi starts. The time difference dT between the moments t15 and t15' is nearly one line period. So, if the active edge of one of the horizontal start pulses H is very near to the active edge of the vertical start pulse V, a small shift between both active edges can cause the display of the second information to jump about one line in the vertical direction.

Figure 2A:
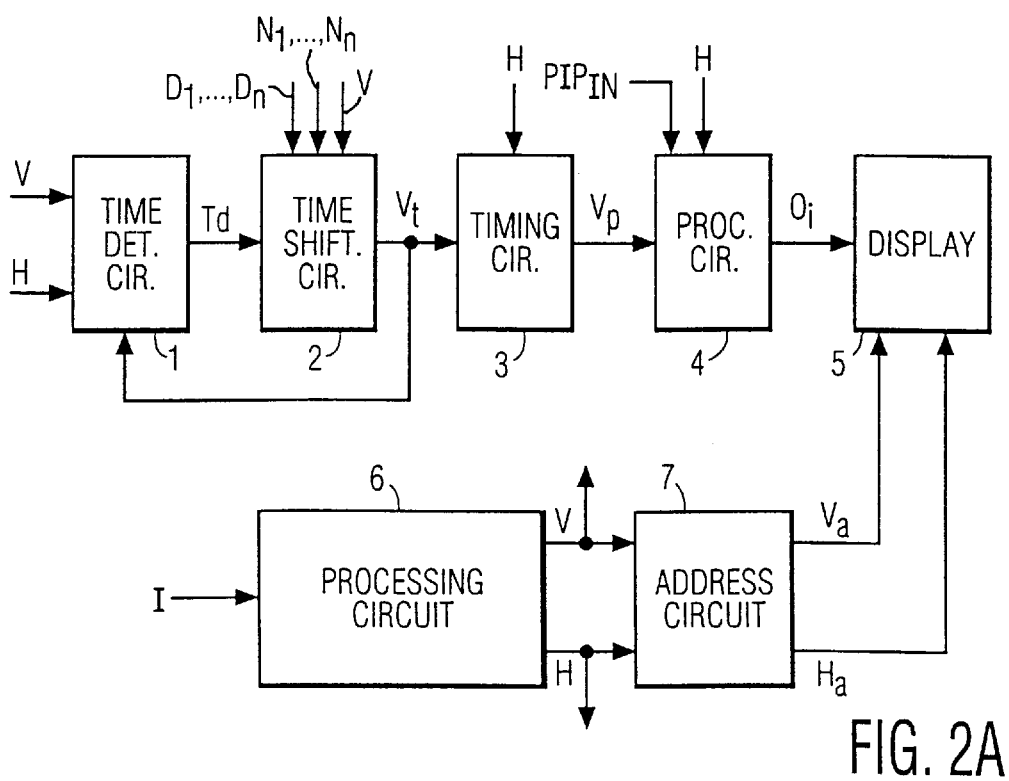
FIG. 2A shows a block diagram of a display apparatus comprising a vertical position-jitter elimination circuit according to the invention.

FIG. 2A shows a block diagram of a display apparatus comprising a vertical position-jitter elimination circuit 1, 2, 6 according to the invention. A processing circuit 6 receives the first information I for generating vertical V and horizontal H start pulses. An addressing circuit 7 receives the vertical V and horizontal H start pulses to supply vertical Va and horizontal Ha addressing signals to a display device 5 for controlling a vertical position of a field of lines, and horizontal positions of the lines on the display device 5 with regard to the first information I. The vertical start pulse V is related to the vertical addressing signal Va, and corresponds to a vertical starting position of the first information I on the display device 5. The horizontal start pulses H are related to the horizontal addressing signal Ha, and correspond to horizontal starting positions of the first information I on the display device 5. A time detection circuit 1 receives the vertical start pulses V and the horizontal start pulses H. and supplies a time difference signal Td. In every field, the time difference signal Td is a measure for the time elapsing between an active edge of the vertical start pulse V (or an active edge of a vertical trigger pulse Vt), and an active edge of a nearest horizontal start pulse H which is nearest to that active edge of the vertical start pulse V. A time shifting circuit 2 receives the time difference signal Td, the vertical start pulse V, a set of shift periods D1, . . . ,Dn, and a set of predetermined values N1, . . . ,Nn, corresponding to the set of shift periods D1, . . . ,Dn, and supplies the vertical trigger pulse Vt. In a certain field, the vertical trigger pulse Vt corresponds to the vertical start pulse V delayed over a shift period Di. The operation of the time shifting circuit 2 will be elucidated below with reference to FIGS. 2B, 2C and 2D. A timing circuit 3 receives the vertical trigger pulse Vt and the horizontal start pulses H, and supplies a vertical position signal Vp to a second processing circuit 4. The vertical position signal Vp determines the vertical position of the second information Oi on the display device 5. The second processing circuit 4 further receives the horizontal start pulses H, and supplies the second information Oi to the display device 5. The timing circuit 3 determines the vertical position of the second information Oi by counting a certain number of the horizontal start pulses H; this counting operation is initiated by the active edge of the vertical trigger pulse Vt. As it is ensured that the active edges of the horizontal start pulses H are not close to the active edge of the vertical trigger pulse Vt, the vertical position of the second information Oi does not show any vertical position-jitter.

The second information Oi can be generated by the second processing circuit 4 with a self-contained display information generator (for generating Teletext or On-Screen Display (OSD) information), or the second information is already display information (like PIP image information) which is supplied at input $PIP_{IN}$, the second information Oi being converted by the second processing circuit 4 to obtain a proper format suitable for display on the display device 5.

Figure 2B:
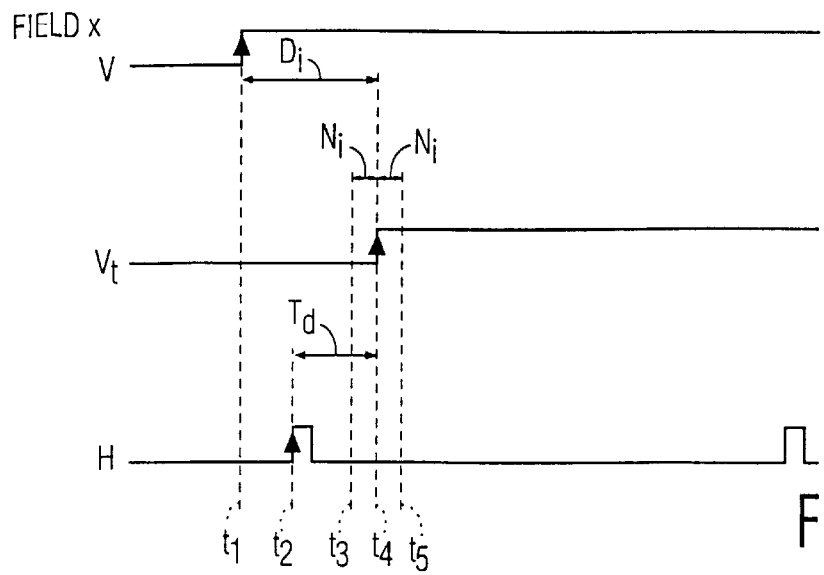
FIGS. 2B, 2C and 2D show timing diagrams for explaining the operation of the vertical position-jitter elimination circuit according to the invention.
Figure 2C:
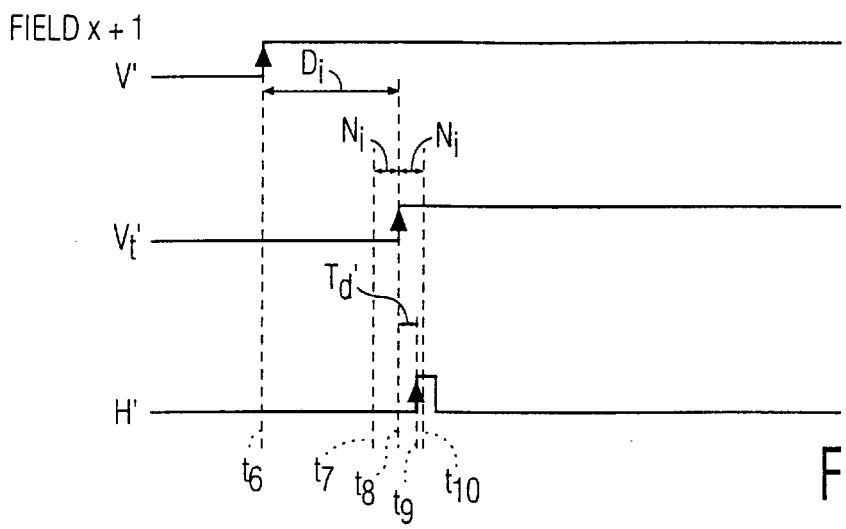
Figure 2D:
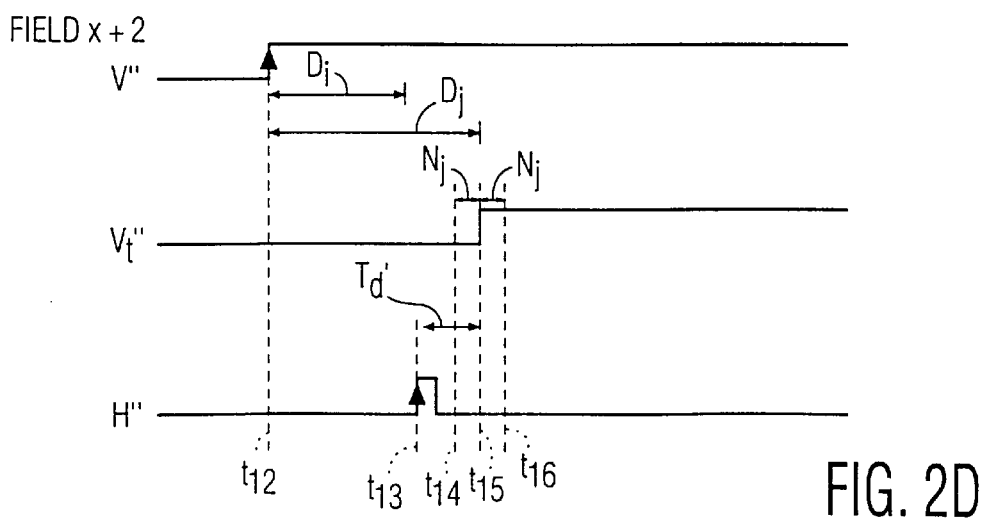

FIGS. 2B, 2C and 2D show timing diagrams for explaining the operation of the vertical position-jitter elimination circuit as shown in FIG. 2A. As an example, in FIG. 2B, a first field x is shown, in which an active edge of a first vertical trigger pulse Vt occurring at moment t4, corresponds to an active edge of a first vertical start pulse V occurring at moment t1 which is delayed over a first shift period Di (t4–t1). A first time difference Td (t4–t2) is present between the active edge of a first nearest horizontal start pulse H occurring at moment t2, and the active edge of the first vertical trigger pulse Vt. The first time difference Td is larger than a first predetermined value Ni (t5–t4, t4–t3) corresponding to the first shift period Di. The first predetermined value Ni is defined with respect to the active edge of the first vertical trigger pulse Vt. As the first time difference Td in the first field x is larger than the first predetermined value Ni, in FIG. 2C, a second field x+1 is shown, in which the active edge of a second vertical trigger pulse Vt' occurring at moment t8 is made to correspond to the active edge of a second vertical start pulse V' occurring at moment t6 being still delayed over the first shift period Di. In the second field x+1, the active edge of a second nearest horizontal start pulse H' occurring at moment t9 is too close to the active edge of the second vertical trigger pulse Vt'. A second time difference Td' (t9–t8) is now smaller than the first predetermined value Ni, which causes, in a third field x+2, the active edge of a third vertical start pulse V" occurring at moment t12 to be delayed over a second shift period Dj (t15–t12) as shown in FIG. 2D. The active edge of a third vertical trigger pulse Vt" occurring at moment t15 obtained in this way, shows again a safe margin between the active edge of the third vertical trigger pulse Vt" and the active edge of the third nearest horizontal start pulse H" occurring at moment t13. Although the second shift period Dj is shown to be longer than the first shift period Di, the second shift period Dj could as well be shorter than the first shift period Di. Furthermore, one of the shift periods D1, . . . ,Dn can be zero. If, in the third field x+2, the second time difference Td' is smaller than a second predetermined value Nj, the active edge of a fourth vertical trigger pulse will be delayed with respect to the active edge of a fourth vertical start pulse with a third shift period, and so on. The vertical position-jitter elimination circuit needs at least two shift periods D1, . . . ,Dn to be able to eliminate vertical position-jitter. The shift periods D1, . . . ,Dn and the corresponding predetermined values N1, . . . ,Nn, can all have the same value or can be dependent on the shift period Di.

Figure 2E:
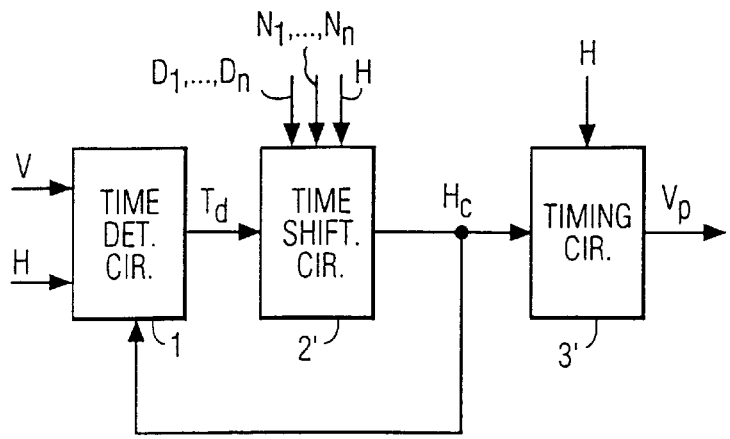
FIG. 2E shows a block diagram of a part of a vertical position-jitter elimination circuit according to the invention.

FIG. 2E shows a block diagram of a part of a vertical position-jitter elimination circuit. In this case, the horizontal start pulses H are shifted in time. A time detection circuit 1 receives the vertical start pulses V and the horizontal start pulses H, and supplies a time difference signal Td. In every field, the time difference signal Td is a measure for the time elapsing between an active edge of the vertical start pulse V, and an active edge of a nearest horizontal start pulse H which is nearest to that active edge of the vertical start pulse V (or an active edge of a horizontal count pulse Hc, being the nearest horizontal start pulse H delayed over a predetermined shift period Di). The time shifting circuit 2' receives the time difference signal Td, the horizontal start pulses H, a set of shift periods D1, . . . ,Dn and a set of predetermined values N1, . . . ,Nn corresponding to the set of shift periods D1, . . . ,Dn, and supplies the horizontal count pulses Hc. The timing circuit 3' receives the horizontal count pulses Hc and the vertical start pulses V, to supply the vertical position signal Vp. The timing circuit 3' determines the vertical position of the second information Oi by counting a certain number of the horizontal count pulses Hc; this counting operation is initiated by an active edge of the vertical start pulse V. Suppose, in an existing field, an active edge of the nearest count pulse Hc (being shifted with an existing shift period Di, which can be zero) is too close to an active edge of a corresponding vertical start pulse V. In a next field, an active edge of the nearest horizontal count pulse Hc, or active edges of all horizontal count pulses Hc, can be delayed over a next shift period Dj. The next shift period Dj is chosen such that the time difference Td is larger than the predetermined value Ni.

Figure 3A:
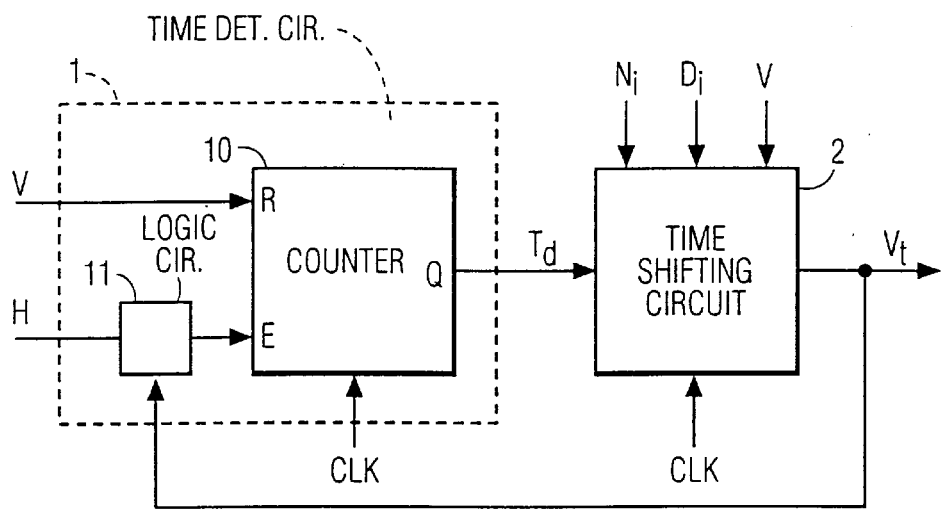
FIG. 3A shows a block diagram of a first embodiment of the vertical position-jitter elimination circuit according to the invention.
Figure 3B:
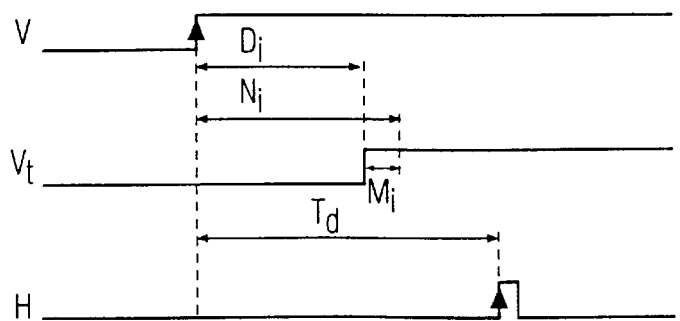
FIG. 3B shows a timing diagram for explaining the operation of the first embodiment.

FIG. 3A shows a block diagram of a first embodiment of the vertical position-jitter elimination circuit according to the invention. The time detection circuit 1 comprises a counter 10 and a logic circuit 11. The counter 10 receives the vertical start pulse V at a reset input R for disabling the reset of the counter 10 after occurrence of an active edge of the vertical start pulse V. The logic circuit 11 receives the horizontal start pulses H and the vertical trigger pulse Vt, and supplies an enable signal coupled with an enable input E of the counter 10, which enable signal disables the counter 10 at a moment of occurrence of the active edge of the nearest horizontal start pulse H after the active edge of the vertical trigger pulse Vt. As the counter 10 further receives clock pulses CLK, the counter 10 supplies at an output Q, a count value, being the number of clock pulses CLK occurring between the active edge of the vertical start pulse V and the active edge of the nearest horizontal start pulse H. So, the time difference signal Td, which is the count value, is a measure for the time between the active edge of the vertical trigger pulse Vt and the active edge of the nearest horizontal start pulse H which is nearest to that active edge of the vertical trigger pulse Vt, see also FIG. 3B. A repetition frequency of the clock pulses CLK determines the accuracy of the time difference signal Td, and has to be chosen sufficiently high with respect to a repetition frequency of the horizontal start pulses H.

The time shifting circuit 2 comprises a finite state machine, and receives the time difference signal Td, the vertical start pulse V, the set of the shift periods D1, . . . ,Dn, the set of the predetermined values N1, . . . ,Nn corresponding to the set of shift periods D1, . . . ,Dn, and the clock pulses CLK, to supply the vertical trigger pulse Vt. The finite state machine has a state for every shift period Di out of the set of the shift periods D1, . . . ,Dn. To every state or every shift period Di, a predetermined value Ni is linked. The value of the predetermined value Ni is expressed in a number of clock pulses CLK which occurs between, on the one hand, the active edge of the vertical start pulse V, and, on the other hand, a certain margin Mi after the active edge of the vertical trigger pulse Vt, see FIG. 3B. Suppose that the finite state machine is in an existing field in an existing state, in which the active edge of the vertical trigger pulse Vt is shifted with respect to the active edge of the vertical start pulse with an existing shift period Di, in which an existing predetermined value Ni is active, and in which an existing time difference signal Td is determined. In a next frame, the finite state machine will then generate an active edge of a next vertical trigger pulse Vt' being shifted over a next shift period Dj with respect to an active edge of a next vertical start pulse V'. The next shift period Dj will be the existing shift period Di if the existing time difference signal Td has a count value larger than the existing predetermined value Ni. The next shift period Dj will be another shift period Dk selected out of the set of shift periods D1, . . . ,Dn different from the existing shift period Di, if the existing time difference signal Td has a count value smaller than the existing predetermined value Ni. In the last case, the finite state machine changes to another state corresponding to that another shift period Dk. The finite state machine will be simple if the another state is the next following state of the existing state. If the existing state is the last state, the next following state will be the first state. The shifting circuit 2 could also comprise a microcomputer for determining whether the time difference signal Td is smaller than a predetermined value Ni, and for choosing an appropriate next shift period Dj.

Figure 4A:
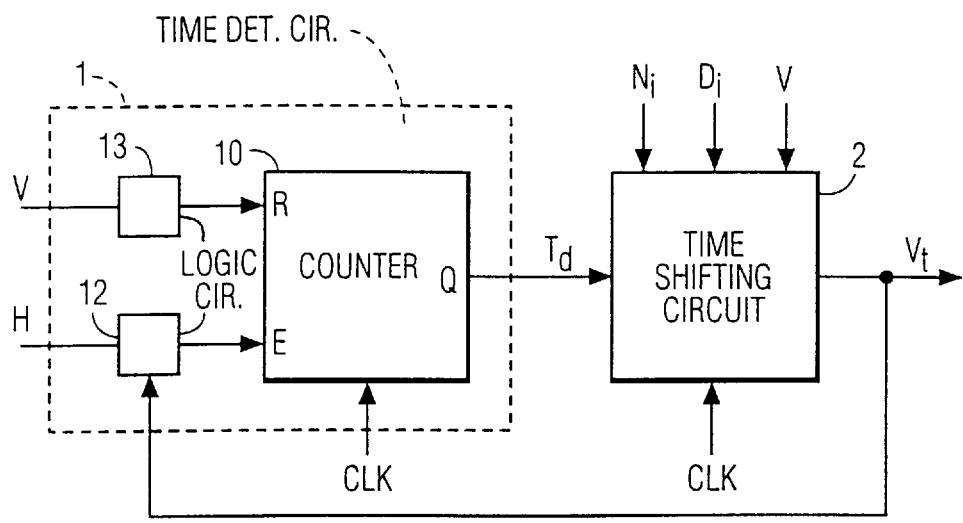
FIG. 4A shows a block diagram of a second embodiment of the vertical position-jitter elimination circuit according to the invention.
Figure 4B:
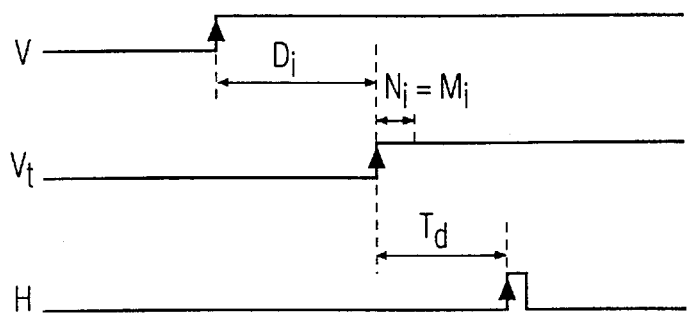
FIG. 4B shows a timing diagram for explaining the operation of the second embodiment.

FIG. 4A shows a block diagram of a second embodiment of the vertical position-jitter elimination circuit according to the invention. The time detection circuit 1 comprises a counter 10, a second logic circuit 13, and a third logic circuit 12. The second logic circuit 13 receives the vertical start pulse V to supply a vertical reset pulse Vr to the reset input R of the counter 10 for resetting the counter 10 before occurrence of the active edge of the vertical trigger pulse Vt. The third logic circuit 12 receives the horizontal start pulses H and the vertical trigger pulse Vt, and supplies an enable signal coupled with an enable input E of the counter 10 for enabling the counter 10 between the active edge of the vertical trigger pulse Vt and the active edge of the nearest horizontal start pulse H after the active edge of the vertical trigger pulse Vt. As the counter 10 further receives clock pulses CLK, the counter 10 supplies at an output Q a count value being the number of clock pulses CLK occurring between the active edge of the vertical trigger pulse Vt and the active edge of the nearest horizontal start pulse H. So, the time difference signal Td, being the count value, is a measure for the time between the active edge of the vertical trigger pulse Vt and the active edge of the nearest horizontal start pulse H being nearest to the active edge of the vertical trigger pulse Vt, see FIG. 4B.

The time shifting circuit 2 comprises again a finite state machine, which operates in the same manner as described for the first embodiment of the invention. In this second embodiment of the invention, the finite state machine has a state for every shift period Di out of the set of the shift periods D1, . . . ,Dn, and to every state or every shift period Di, a predetermined value Ni is linked, which has a value expressed in a number of clock pulses occurring between, on the one hand, the active edge of the vertical trigger pulse Vt and, on the other hand, a certain margin Mi after the active edge of the vertical trigger pulse Vt, see FIG. 4B.

Figure 5A:
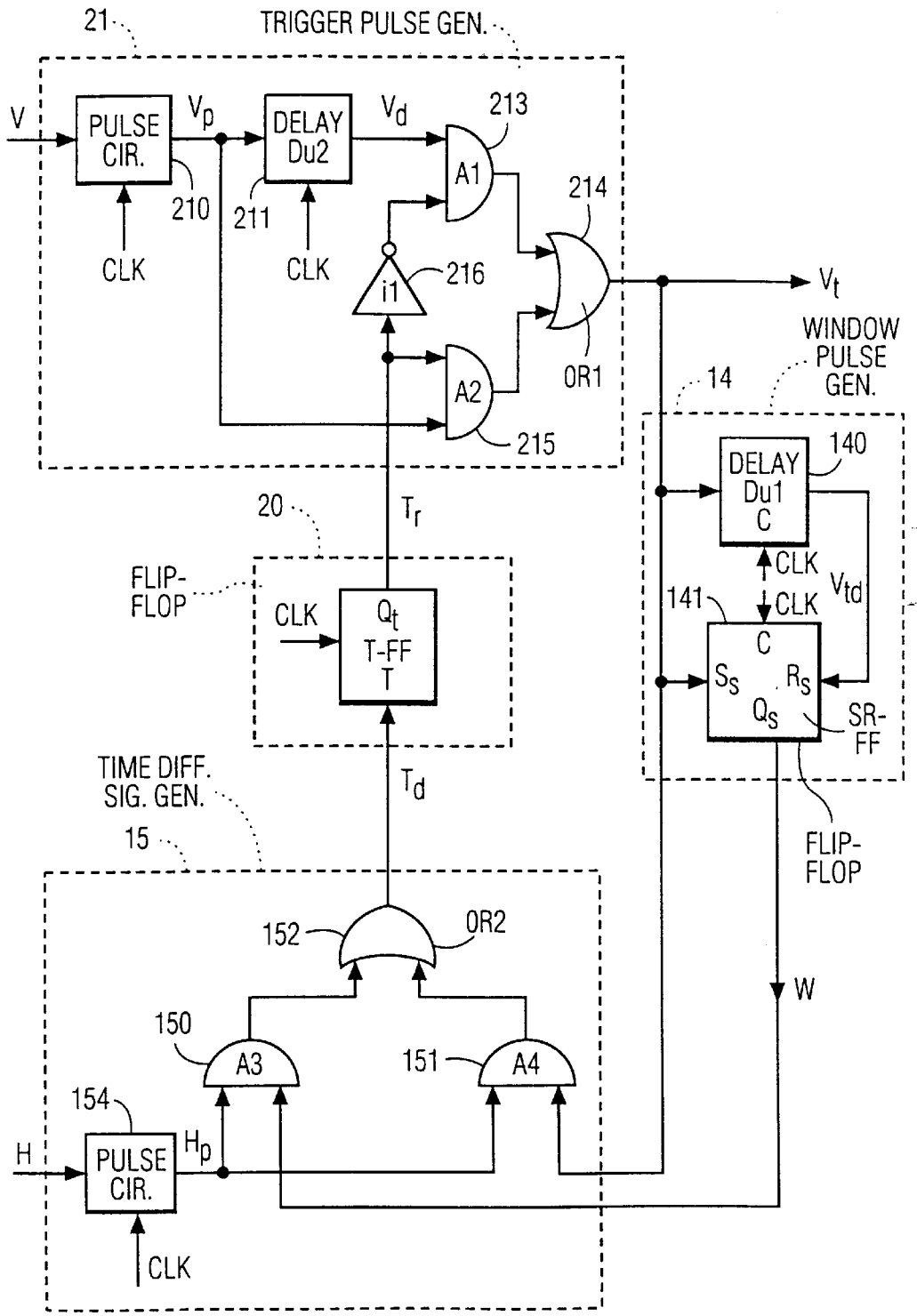
FIG. 5A shows a block diagram of a third embodiment of the vertical position-jitter elimination circuit according to the invention.

FIG. 5A shows a block diagram of a third embodiment of the vertical position-jitter elimination circuit according to the invention.

Figure 5B:
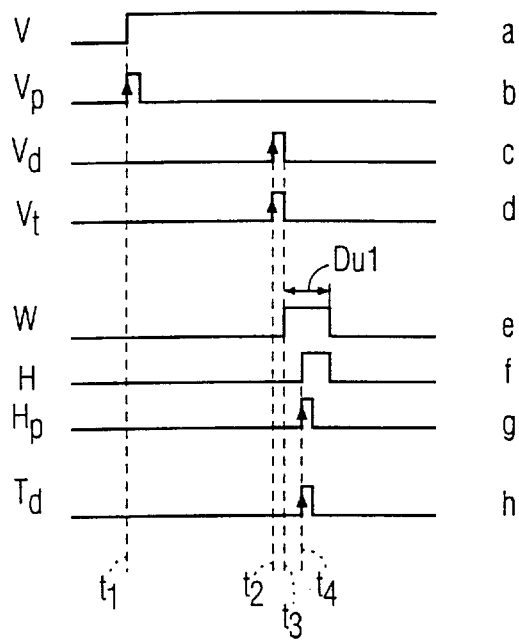
FIG. 5B shows a timing diagram for explaining the operation of the third embodiment.

In a trigger pulse generating circuit 21, a first pulse circuit 210 receives the vertical start pulse V (see "a" in FIG. 5B), and clock pulses CLK to supply a vertical pulse Vp (see "b" in FIG. 5B), having an active period of one clock period, and occurring immediate after the active edge of the vertical start pulse V. A first delay circuit 211 receives the vertical pulse Vp to supply a delayed vertical pulse Vd (see "c" in FIG. 5B) to a first input of a first logical AND-gate 213. The first delay Du2 is not critical and can range from about two microseconds up to half a horizontal line period. A second logical AND-gate 215 receives, at a first input, the vertical pulse Vp, and has a second input coupled to receive a trigger signal Tr. The trigger signal Tr is supplied by an output Qt of a toggle flip-flop 20. The second input of the first logical AND-gate 213 is coupled to the output of the toggle flip-flop 20 via a logical inverter 216. A first logical OR-gate 214 is coupled to an output of the first logical AND-gate 213, and to an output of the second logical AND-gate 215, and has an output for supplying the vertical trigger signal Vt. A switching circuit, comprising the first logical AND-gate 213, the second logical AND-gate 215, the logical inverter 216, and the first logical OR-gate 214, is steered by the trigger signal Tr. The vertical trigger pulse Vt is the vertical pulse Vp, if the trigger signal Tr has a high level. The vertical trigger pulse Vt is the delayed vertical pulse Vd, if the trigger signal Tr has a low level. The vertical trigger pulse Vt is active during one clock period (see "d" in FIG. 5B).

In a window pulse generating circuit 14, a second delay circuit 140 receives the vertical trigger pulse Vt for supplying a delayed vertical trigger pulse Vtd, which is delayed over a delay period Du1 with respect to the vertical trigger pulse Vt, to a reset input Rs of a set-reset flip-flop 141. The set-reset flip-flop 141 further has a set-input Ss coupled to receive the vertical trigger pulse Vt, and an output Qs for supplying a window pulse W (see "e" in FIG. 5B). The window pulse W becomes active (high level) after the active edge of the vertical trigger pulse Vt via the set input Ss of the set-reset flip-flop 141. The window pulse W becomes inactive after the delay period Du1 via the reset input Rs of the set-reset flip-flop 141. The delay period Du1 is not critical and can range from about 2 microseconds up to half a horizontal line period.

In a time difference signal generating circuit 15, a second pulse circuit 154 receives the horizontal start pulses H (see "f" in FIG. 5B), and the clock pulses CLK, to supply a horizontal pulse Hp (see "g" in FIG. 5B), which has an active period of one clock period, and which occurs immediate after the active edge of the horizontal start pulse H. A third logical AND-gate 150 has a first input to receive the horizontal pulse Hp, a second input to receive the window pulse W, and an output coupled to a first input of a second logical OR-gate 152. A fourth logical AND-gate 151 has a first input for receiving the horizontal pulse Hp, a second input for receiving the vertical trigger pulse Vt, and an output coupled to a second input of the second logical OR-gate 152. An output of the second logical OR-gate 152 is coupled to a toggle input T of the toggle flip-flop 20 to supply the time difference signal Td. The time difference signal Td is active if the horizontal pulse Hp occurs during the one clock period that the vertical trigger pulse Vt is active (via the fourth logical AND-gate 151), or if the horizontal pulse Hp occurs during the window pulse W (via the third logical AND-gate 150)(see "h" in FIG. 5B). An active time difference signal Td causes the output of the toggle flip-flop 20 to change level. So, if the horizontal pulse Hp occurs during a window between the active edge of the vertical trigger pulse Vt and the end of the window pulse W, the active edge of a next vertical trigger pulse Vt will be selected to have another position with respect to the vertical start pulse V (and thus with respect to the horizontal pulses Hp) than the active edge of a preceding vertical trigger pulse Vt. The other position of vertical trigger pulse Vt is caused by selecting, via the toggle flip-flop 20, the vertical pulse Vp directly or via the first delay Du1.

It is preferred to operate the third embodiment, according the invention, in a synchronous manner. Therefore, the first delay circuit 211, the second delay circuit 140, the set-reset flip-flop and the trigger flip-flop 20 have an extra input for receiving the clock pulses CLK.

It is not essential to the operation of the third embodiment, according to the invention, that it is checked whether the horizontal pulse Hp occurs during the active period (lasting one clock period) of the vertical trigger pulse Vt. Because, in this case, the timing circuit 3 (see FIG. 2B) for counting, starting after the active edge of the vertical trigger pulse Vt, the horizontal start pulses H, for determining the vertical position of the second information, will not count the horizontal pulse Hp occurring during the active period of the vertical trigger pulse Vt. So, it is possible to omit the fourth logical AND-gate 151 and the second logical OR-gate 152 without introducing vertical position-jitter. But a drawback of not checking whether the horizontal pulse Hp occurs during the active period of the vertical trigger pulse Vt, is that will not be detected whether the horizontal start pulse H is very close to the active edge of the vertical trigger pulse Vt, and, although the risk of occurrence of vertical position-jitter is very high, no action is taken to shift the active edge of the vertical trigger pulse Vt out of the dangerous zone.

The embodiment shown in FIG. 5A may generate two vertical trigger pulses Vt, Vt' succeeding each other within a short period of time. This is the case if the vertical trigger pulse Vt is selected to be the vertical pulse Vp and a horizontal pulse Hp occurs during the window pulse W which is active after the trigger pulse Vt. As the horizontal pulse Hp occurs during the window pulse W, the trigger signal Tr is made low and the next vertical trigger pulse Vt' is selected to be the delayed vertical pulse Vd. The next vertical trigger pulse Vt' succeeds the vertical trigger pulse Vt after the first delay period Du2. If desired, it is possible to prevent the occurrence of the two vertical trigger pulses Vt, Vt' within a small period of time by changing the level of the trigger signal Tr not earlier than the first delay period Du2 is finished. This could be achieved by adding a D flip-flop which receives the trigger signal Tr at a data input and supplies an adapted trigger signal to the selection circuit 213, 214, 215, 216, which selects the vertical pulse to be the vertical pulse Vp or the delayed vertical pulse Vd. The D flip-flop has a clock input for receiving the clock pulses CLK and an enable input for receiving a signal related to the first delay period Du2 for enabling the adapted trigger signal to change level earlier than the first delay period Du2 is finished.

Figure 6:
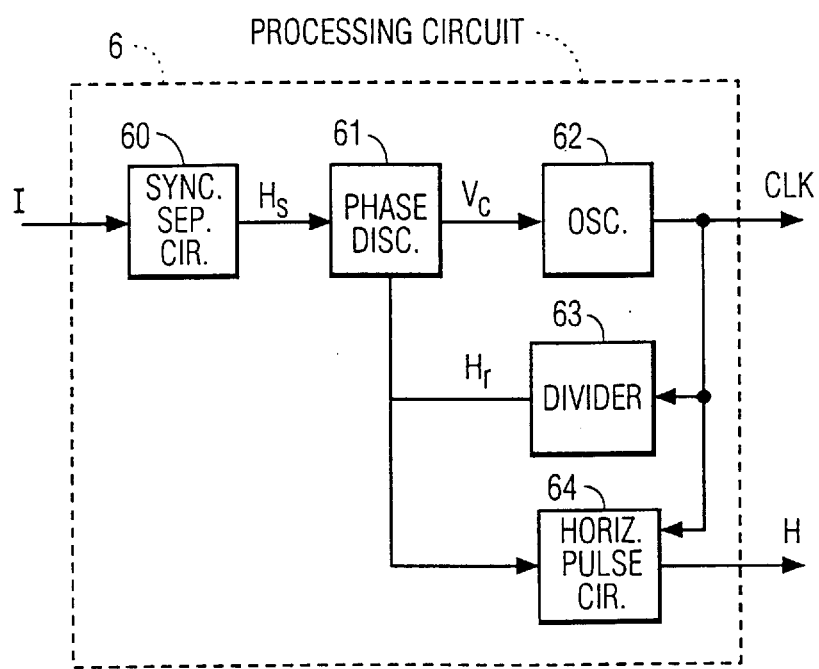
FIG. 6 shows a block diagram of an embodiment of a processing circuit for use in the vertical position-jitter elimination circuit according to the invention.

FIG. 6 shows an embodiment of a processing circuit for use in the vertical position-jitter elimination circuit according to the invention. A horizontal synchronization separation circuit 60 is coupled to receive the first information I for separating horizontal synchronization pulses Hs from the first information I. The separation circuit 60 is not needed if the first information I comprises separate horizontal synchronization pulses Hs.

A phase discriminator 61 has a first input to receive the horizontal synchronization pulses Hs, a second input to receive regenerated horizontal synchronization pulses Hr, and an output for supplying a control voltage Vc depending on a phase difference between the horizontal synchronization pulses Hs and the regenerated horizontal synchronization pulses Hr. A voltage-controlled oscillator 62 receives the control voltage Vc for supplying clock pulses CLK of which the repetition frequency is controlled by the control voltage Vc, and of which the repetition frequency is in a stable situation with a certain number (N) multiplied repetition frequency of the horizontal synchronization pulses Hs. A divider 63 receives the clock pulses CLK for supplying the regenerated horizontal synchronization pulses Hr by dividing the clock pulses CLK with the certain number. In this known way, the regenerated horizontal synchronization pulses Hr are locked to the horizontal synchronization pulses Hs by using a phase-locked loop 61, 62, 63. A horizontal pulse circuit 64 receives the clock pulses CLK and the regenerated horizontal synchronization signal Hr for generating the horizontal start pulses H, being locked to the regenerated horizontal synchronization pulses Hr. The control voltage Vc may be supplied to the voltage-controlled oscillator 62 via a loop-filter (not shown).

In a simple implementation, the divider 63 may comprise a series arrangement of counters, which count certain count numbers n1, . . . ,nk of clock pulses CLK, respectively. A multiplication of all count numbers n1, . . . ,nk renders the certain number N. A duration of the shift periods Di, and a duration of the margins Mi (corresponding to the predetermined values Ni) is generated by selecting the count numbers n1, . . . ,nk correspondingly. The duration of shift periods Di might be chosen to be one-eight of a horizontal period duration (Th) multiplied by a natural number: a first shift period is zero, a second shift period equals one-eight of a horizontal period duration, and a third shift period equals one-fourth of a horizontal period duration. The duration of all margins Mi might be chosen to be the horizontal period duration divided by thirty-two. By using a phase-locked loop 61, 62, 63, the shift periods Di and the margins Mi will scale automatically with the horizontal period duration.

Figure 7:
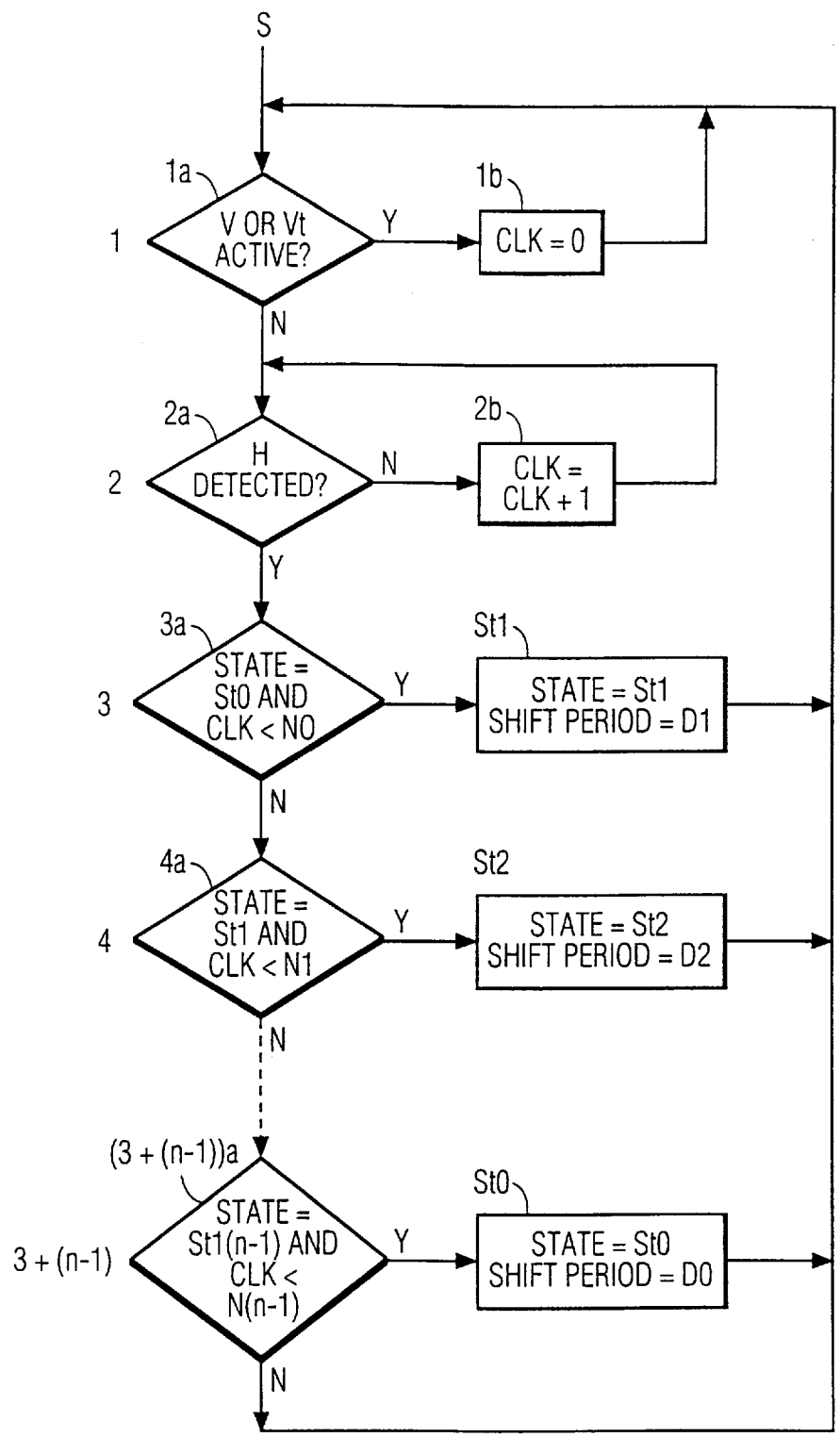
FIG. 7 shows a flowchart diagram for explaining a software algorithm for eliminating vertical position-jitter according to the invention.

FIG. 7 shows a flowchart diagram for explaining a version of a software algorithm for eliminating vertical position-jitter according to the invention. In a first step 1, it is checked whether a vertical start pulse V or a vertical trigger pulse Vt is active. If yes, a count of a time difference Td is kept zero, if no, the counting of clock pulses CLK starts. In a second step 2, it is checked, after every clock pulse CLK, whether an active edge of the first horizontal start pulse H after the active edge of the vertical trigger pulse Vt is detected. If no, a count value of clock pulses CLK is incremented by one, if yes, the count value, thus being a measure for the time between the active edge of the vertical trigger pulse Vt and the first horizontal start pulse H after the active edge of the vertical trigger pulse Vt, will be stored. Next steps 3,4, . . . ,3+(n−1) can each be interpreted to represent a state of a finite state machine. In every state St0, . . . ,Stn−1, a shift period D0, . . . ,Dn−1 and a predetermined value N0, . . . ,Nn−1 are defined. Suppose that, in the existing field, the software is in state Sti so that the vertical trigger pulse Vt is a vertical start pulse V delayed over a shift period Di. After storing the count value, the software proceeds with checking whether the actual state Sti is a zero state St0, and whether the count value (representing the time difference signal Td) is smaller than a first predetermined value (or margin) N0. If both are true, a first state St1 (called "jump 1") will be entered, which means that in the next frame, the active edge of the vertical start pulse V will be shifted with a first shift period D1, and thereafter the software will return to the first step 1 to wait for a start of a next vertical period. If no, the software will proceed (in step 4) with checking whether the actual state Sti is the first state St1 and whether the count value is smaller than a second predetermined value N1. And so on. If, in the last step 3+(n−1), it is detected that the actual state Sti is the last state Stn−1, and that the count value is smaller than a last predetermined value Nn−1, the software enters a next state which is the zero state St0. To decrease the time needed to perform the software algorithm, it is possible to store the actual state Sti, so that in a next vertical period, it becomes possible to start with checking whether the time difference Td has become smaller than that of the state Sti corresponding to predetermined value Ni, instead of scanning all the states as described before. In the flowchart diagram:

1a—V active or Vt active?

1b—count=0

2a—first active edge of H detected?

2b—count:=count+1

3a—state=zero state St0 AND count<margin N0?

st1—state:=first state St1 (jump 1), extend active edge of vertical start pulse V with time period D1.

4a—state=jump 1 AND count<margin N1?

St2—state:=second state St2 (jump 2), extend active edge of vertical start pulse V with time period D2.

5a—state jump n−1 AND count<margin Nn−1?

St0—state:=zero state St0, no extension of active edge of vertical start pulse V (D0=0).

In FIGS. 1, 2B, 3B, 4B, and 5B, the vertical start pulse V is drawn as a vertical blanking pulse, becoming active high after detection of a vertical synchronization pulse corresponding to, or being extracted from the first information I, having a duration related to the time between an end of a vertical addressing period of an existing field and a start of the vertical addressing of a next field, and having the leading edge as an active edge. In the same manner, the horizontal start pulse H is drawn as a horizontal blanking pulse, becoming active high after detection of a horizontal synchronization pulse corresponding to, or being extracted from the first information I, and having a duration related to the time between an end of a horizontal addressing period of an existing line and a start of the horizontal addressing of a next line, and having the leading edge as an active edge. It will be appreciated that the duration, the active level, and the active edge of the vertical start pulse V and/or the horizontal start pulse H, can be chosen differently without departing from the scope of the invention. So, the active edge could as well be chosen to be a trailing edge instead of a leading edge. Also flyback pulses or other pulses related to the position on the display screen could be used instead of blanking pulses. The active edge could also represent the middle of the active period of one of the above mentioned horizontal or vertical pulses.

It will be appreciated that the method for vertical position-jitter elimination, and the vertical position-jitter elimination circuit according to the invention, as described above for eliminating vertical position-jitter of a second information Oi with respect to a first information I, can also be used with advantage to eliminate vertical position-jitter of more than one second information, as may be the case if Picture-In-Picture (PIP) and On-Screen Display (OSD) information are displayed simultaneous, or in multimedia applications in which numerous windows, each with a related information, are displayed.

We claim:

1. Method of eliminating jitter in a vertical position of a second information displayed on a display device on which a first information is displayed, the first information determining an addressing of the display device, the method comprising the steps of:

generating vertical start pulses and horizontal start pulses to control vertical start positions of fields of the first information and horizontal start positions of lines of the first information, respectively, on the display device; and counting a predetermined number of the horizontal start pulses, to define a vertical start position for a display of the second information on the display device, characterized in that the method comprises the further steps of:

generating, in a first field of the first information, and in response to an active edge of a first vertical start pulse, a first vertical trigger pulse having an active edge which is the active edge of the first vertical start pulse shifted in time over a predetermined first shift period;

starting, in each field of the first information, the counting of the predetermined number of the horizontal start pulses in response to an active edge of a corresponding vertical trigger pulse, whereby the active edge of the vertical trigger pulse is an active edge of a corresponding vertical start pulse shifted over a current shift period;

generating, in each field of the first information, and in response to an active edge of a corresponding vertical start pulse, a next vertical trigger pulse having an active edge which is shifted with respect to an active edge of a next vertical start pulse over said current shift period; and generating, in predetermined fields of the first information, and in response to active edges of corresponding vertical start pulses, adjusted shift periods by the steps of:

determining a current time difference between an active edge of a current vertical trigger pulse, and an active edge of a current horizontal start pulse nearest to the active edge of the current vertical trigger pulse;

checking whether the current time difference is smaller than a current predetermined value; and generating a next shift period unequal to the current shift period, if the current time difference is smaller than the current predetermined value, whereby said next shift period is selected such that an absolute value of a time difference between an active edge of a hypothetical vertical trigger pulse derived from the current vertical start pulse by shifting over said next shift period, and the active edge of the current horizontal start pulse nearest to said hypothetical vertical trigger pulse, is not smaller than the current predetermined value, said next shift period forming the current shift period for a next field of the first information.

2. Method of eliminating vertical position-jitter according to claim 1, characterized in that the step of determining the current time difference comprises the step of measuring a time duration elapsing between the active edge of the current vertical start pulse and the active edge of a first occurring horizontal start pulse after the active edge of the current vertical trigger pulse, and in that the current predetermined value corresponds to a time period between the active edge of the corresponding vertical start pulse and a certain time period after the active edge of the current vertical trigger pulse.

3. Method of eliminating vertical position-jitter according to claim 1, characterized in that the step of determining the current time difference comprises the step of measuring a time duration elapsing between the active edge of the current vertical trigger pulse and an active edge of a first occurring horizontal start pulse after the active edge of the current vertical trigger pulse, and in that the current predetermined value corresponds to a time period between the active edge of the current vertical trigger pulse and a certain time period after the active edge of the current vertical trigger pulse.

4. Method of eliminating vertical position-jitter according to claim 1, characterized in that the steps of determining the current time difference, and checking whether the current time difference is smaller than the current predetermined value, comprise the steps:

creating a window pulse by the steps of generating a starting moment of the window pulse related to the active edge of the current vertical trigger pulse, and generating a certain window duration of the window pulse; and generating the current time difference signal, and checking whether the current time difference is smaller than the current predetermined value, by causing the current time difference to be active if the active edge of a first occurring horizontal start pulse after the active edge of the current vertical trigger pulse occurs during the window pulse.

5. Method of eliminating vertical position-jitter according to claim 1, characterized in that the current and the next shift periods are selected out of n successive shift periods; and the predetermined value is selected out of n successive predetermined values, corresponding to the n successive shift periods, n being a natural number larger than one.

6. Method of eliminating vertical position-jitter according to claim 5, characterized in that in a next fields the active edge of the next vertical trigger pulse is shifted over the current shift period if the current time difference is not smaller than the current predetermined value corresponding to the current shift period, or the next shift period is a shift period succeeding to the current shift period in said n successive shift periods, if the current time difference is smaller than the current predetermined value, wherein the succeeding shift period is a first shift period in said n successive shift periods if said current shift period is a last shift period in said n successive shift periods.

7. Method of eliminating vertical position-jitter according to claim 4 characterized in that the next shift period is generated by generating a vertical delayed-pulse corresponding to the vertical start pulse delayed over a first shift period, or a delayed-pulse corresponding to the vertical delayed-pulse delayed over a second shift period, wherein the vertical delayed-pulse determines the first shift period, and the delayed-pulse determines a second shift period, respectively, and the generation, in the next field, of the next vertical trigger pulse comprises the step of changing said next shift period over which the active edge of the next vertical trigger pulse is shifted with respect to the active edge of the next vertical start pulse, to another of the two shift periods if said first occurring active edge of the horizontal start pulse occurs during the window pulse, whereby said next shift period is not changed to another of the two shift periods if the active edge of the horizontal start pulse does not occur during the window pulse.

8. Method of eliminating vertical position-jitter according to claim 1, characterized in that the method further comprises the step of:

generating clock pulses, and in that the determining of the current time difference comprises the step of determining a count value by counting the clock pulses.

9. Method of eliminating vertical position-jitter according to claim 4, characterized in that the method further comprises the step of:

generating clock pulses;

and in that the step of generating a certain window duration comprises the step of counting a predetermined number of the clock pulses.

10. Method of eliminating vertical position-jitter according to claim 1, characterized in that the method further comprises the steps of:

generating clock pulses; and counting a predetermined number of the clock pulses to generate the shift periods.

11. Method of eliminating vertical position-jitter according to claim 7, characterized in that the method further comprises the step of:

generating clock pulses, and in that the step of generating the delayed-pulse comprises the step of counting a second predetermined number of clock pulses initiated by the vertical delayed-pulse.

12. Method of eliminating vertical position-jitter according to claim 8, characterized in that the step of generating the clock pulses comprises the steps of:

separating horizontal synchronization pulses from the first information;

generating the clock pulses, which have a clock pulse repetition frequency being equal to a repetition frequency of the horizontal synchronization pulses multiplied by a certain number;

dividing the clock pulses by the certain number to generate regenerated horizontal synchronization pulses; and comparing a phase and/or frequency difference of the horizontal synchronization pulses and the regenerated horizontal synchronization pulses, to generate a control signal to control the clock pulse repetition frequency for locking the repetition frequency of the regenerated horizontal synchronization pulses to the horizontal synchronization pulses, and in that the generation of the horizontal start pulses is locked to the regenerated horizontal synchronization pulses.

13. Vertical position-jitter eliminating circuit for eliminating jitter in a vertical position of a second information displayed on a display device on which a first information is displayed, the first information determining an addressing of the display device, the circuit comprising:

a first processing circuit coupled to receive the first information, for generating vertical and horizontal start pulses to control vertical start positions of fields of lines, and horizontal start positions of the lines, respectively, of the first information on the display device;

timing means for supplying a vertical position signal, defining a vertical starting position on the display of the second information, by counting a predetermined number of the horizontal start pulses; and a second processor circuit coupled to receive said vertical position signal for inserting a display of said second information on said display device, characterized in that the vertical position-jitter eliminating circuit further comprises:

shifting means coupled to receive a vertical start pulse and a shift period, for supplying, in a first field of the first information, a first vertical trigger pulse having an active edge corresponding to an active edge of a first vertical start pulse shifted in time over a first shift period, wherein the timing means are coupled to receive a vertical trigger pulse for initiating, in each field of the first information, the counting of the predetermined number of the horizontal start pulses, whereby an active edge of the vertical trigger pulse is an active edge of a corresponding vertical start pulse shifted over a current shift period, wherein the shifting means are arranged for supplying, in each field of the first information, a next vertical trigger pulse having an active edge corresponding to an active edge of a next vertical start pulse shifted in time over the current shift period, and in that the circuit further comprises:

time detection means coupled to receive a vertical start pulse, a vertical trigger pulse, and the horizontal start pulses, for supplying, in predetermined fields of the first information, a current time difference signal being a measure of a time difference in occurrence between an active edge of a current vertical trigger pulse, and an active edge of a current horizontal start pulse nearest to the active edge of the current vertical trigger pulse, wherein the shifting means are further coupled to receive the current time difference signal, and a predetermined value, for checking, in said predetermined fields of the first information, whether the current time difference signal is smaller than a current predetermined value, and wherein the shifting means generates, in a next field, a next shift period unequal to the current shift period, if the current time difference is smaller than the current predetermined value, whereby said next shift period is selected such that an absolute value of a time difference between an active edge of a hypothetical vertical trigger pulse derived from the current vertical start pulse by shifting over said next shift period, and the active edge of the current horizontal start pulse nearest to said hypothetical vertical trigger pulse, is not smaller than the current predetermined value, said next shift period forming the shift period for a next field of the first information.

14. A picture display apparatus comprising a display device and a vertical position-jitter elimination circuit as defined in claim 13.

15. Method of eliminating jitter in a vertical position of a second information displayed on a display device on which a first information is displayed, the first information determining an addressing of the display device, the method comprising the steps of:

generating vertical start pulses and horizontal start pulses to control vertical start positions of fields of the first information and horizontal start positions of lines of the first information, respectively, on the display device, characterized in that the method comprises the further steps of:

generating, in a first field of the first information, in response to active edges of first horizontal start pulses, first horizontal count pulses, at least one of the first horizontal count pulses having an active edge which is the active edge of a corresponding horizontal start pulse shifted in time over a predetermined first shift period, the at least one of the first horizontal count pulses being nearest to an active edge of a corresponding vertical start pulse;

counting, in each field of the first information, a predetermined number of horizontal count pulses in response to an active edge of a corresponding vertical start pulse, to define a vertical start position for a display of the second information on the display device, whereby an active edge of at least one of said horizontal count pulses is an active edge of a corresponding horizontal start pulse shifted over a current shift period, the at least one of said horizontal count pulses being nearest to an active edge of the corresponding vertical start pulse;

generating, in each field of the first information, in response to active edges of next horizontal start pulses, next horizontal count pulses, at least one of said next horizontal count pulses having an active edge which is shifted with respect to the active edge of a corresponding one of the next horizontal start pulses over said current shift period, the at least one of said next horizontal count pulses being nearest to an active edge of a corresponding next vertical start pulse; and generating, in predetermined fields of the first information, in response to active edges of corresponding vertical start pulses, adjusted shift periods by the steps of:

determining a current time difference between an active edge of a current vertical start pulse, and an active edge of a current horizontal count pulse nearest to the active edge of the current vertical start pulse;

checking whether the current time difference is smaller than a current predetermined value; and generating a next shift period unequal to the current shift period, if the current time difference is smaller than the current predetermined value, whereby said next shift period is selected such that an absolute value of a time difference between an active edge of a hypothetical horizontal count pulse nearest to the active edge of the current vertical start pulse, which hypothetical horizontal count pulse is derived from a corresponding current horizontal start pulse by shifting over said next shift period, and the active edge of the current vertical start pulse, is not smaller than the current predetermined value, said next shift period forming the current shift period for a next field of the first information.

* * * * *